July 31, 1951 C. A. DE GIERS 2,562,529
CONTENTS GAUGE FOR MILK TANKS
Filed June 19, 1948 3 Sheets-Sheet 1
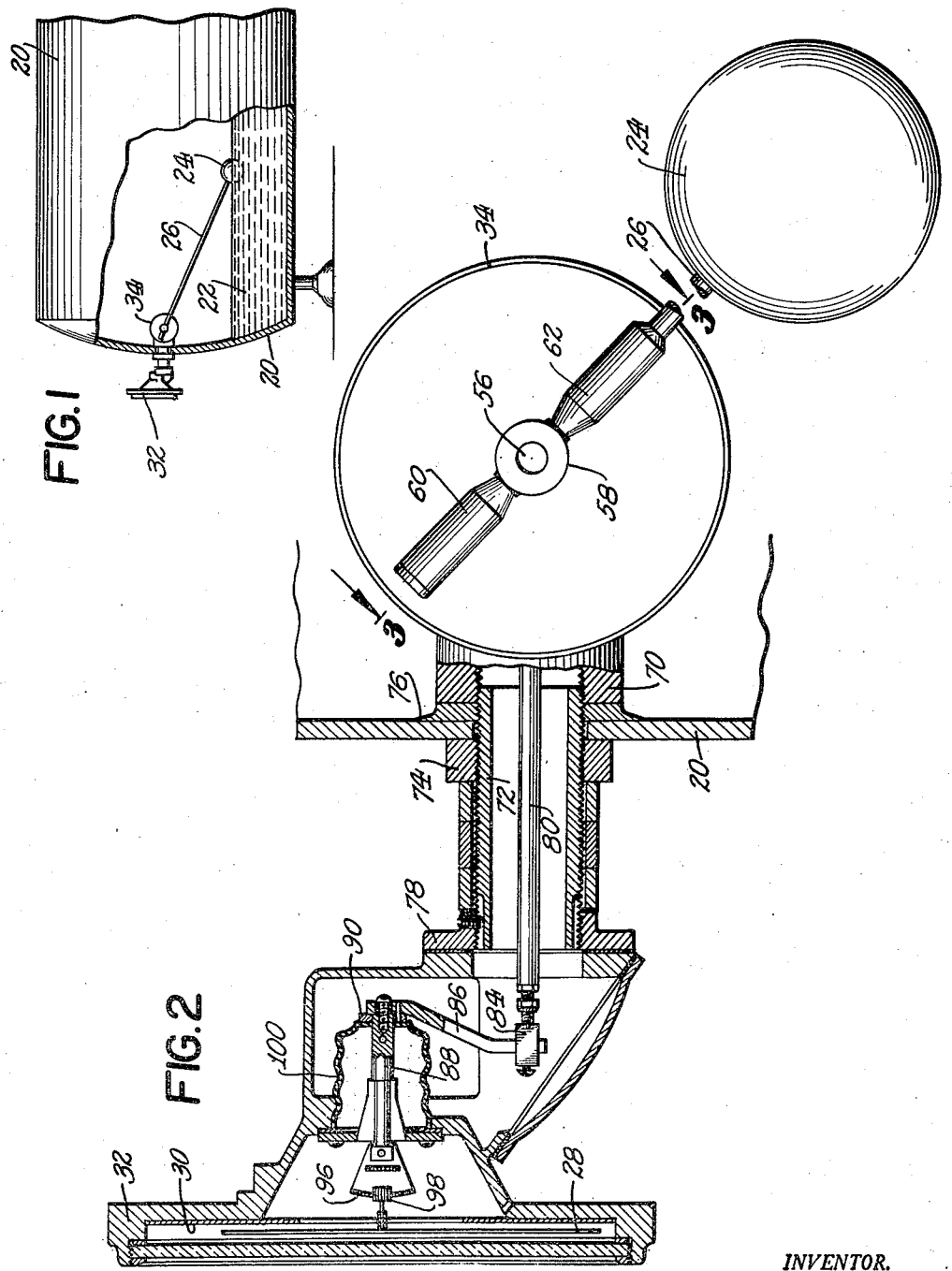
INVENTOR.
CLARENCE A. DE GIERS
BY Robert S. Dunlap
ATTORNEY July 31, 1951     C. A. DE GIERS     2,562,529
CONTENTS GAUGE FOR MILK TANKS
Filed June 19, 1948     3 Sheets-Sheet 2

INVENTOR.
CLARENCE A. DE GIERS
BY Robert S. Dunham
ATTORNEY

July 31, 1951  C. A. DE GIERS  2,562,529
CONTENTS GAUGE FOR MILK TANKS
Filed June 19, 1948  3 Sheets-Sheet 3
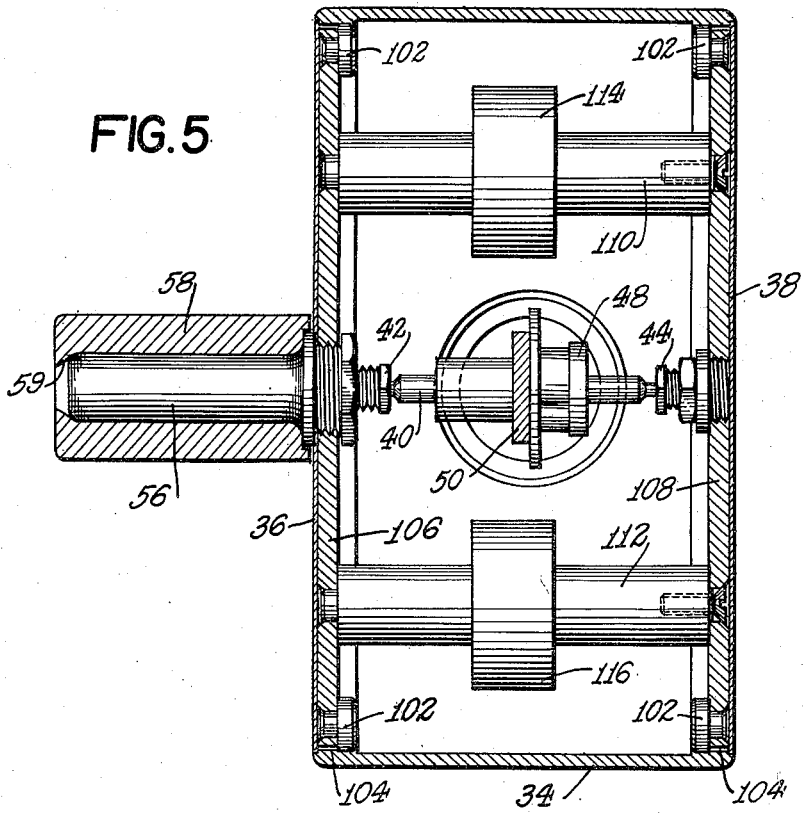
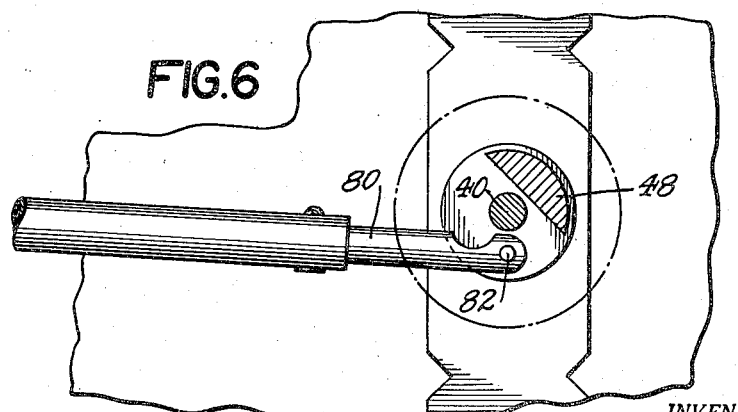
INVENTOR.
CLARENCE A. DE GIERS
BY
*Robert S. Dunham*
ATTORNEY Patented July 31, 1951

2,562,529

UNITED STATES PATENT OFFICE 2,562,529

CONTENTS GAUGE FOR MILK TANKS

Clarence A. de Giers, Forest Hills, N. Y., assignor to The Liquidometer Corporation, Long Island City, N. Y., a corporation of Delaware Application June 19, 1948, Serial No. 34,089

3 Claims. (Cl. 73—317)

1

This invention pertains to an instrument adapted for mounting on a tank containing liquid in the tank, and is an improvement on the indicator disclosed in de Giers Patent No. 1,945,736.

An object of the invention is to provide a gauge particularly adapted for use on tanks containing milk.

A specific object is to provide a float arm gauge which may be readily disassembled and reassembled by hand for cleaning, in which the reassembly operation is foolproof, and in which the parts will properly align themselves when the float arm is placed on its pivot.

To comply with strict sanitary regulations, the indicator driving mechanism within the tank is completely enclosed in a cylindrical housing having a smooth exterior and therefore adapted to be easily cleaned.

The housing is mounted on a horizontal axis. A float arm is pivoted on the same axis but outside the housing. The hub of the float arm is provided with a pair of radially projecting armatures of magnetic material.

Mounted on the axis within the housing are two permanent magnets, one corresponding to each armature, with the result that any movement of the float arm about its axis transmits the same degree of rotation to the magnets within the housing, and that movement of the magnets serves to actuate the pointer of the indicator, all as will appear.

Of course, if desired, the positions of magnets and armatures may be reversed, with the magnets on the float arm and the armatures within the housing.

Although two magnetic circuits are illustrated, it is possible, if desired, to use only a single circuit, or more than two circuits.

The housing, float and arm require no service other than cleaning when the tank is being cleaned.

Further and other objects will be apparent from the specification and claims, and from the accompanying drawings which illustrate what is now considered the preferred embodiment of the invention.

In the drawings:

Fig. 1 is an over-all view of the device installed on a tank;

Fig. 2 is an enlarged view of the device shown in Fig. 1 with the indicator portion in cross-section;

Fig. 5 is a view on line 5—5 of Fig. 4; and

2

Figure 3:
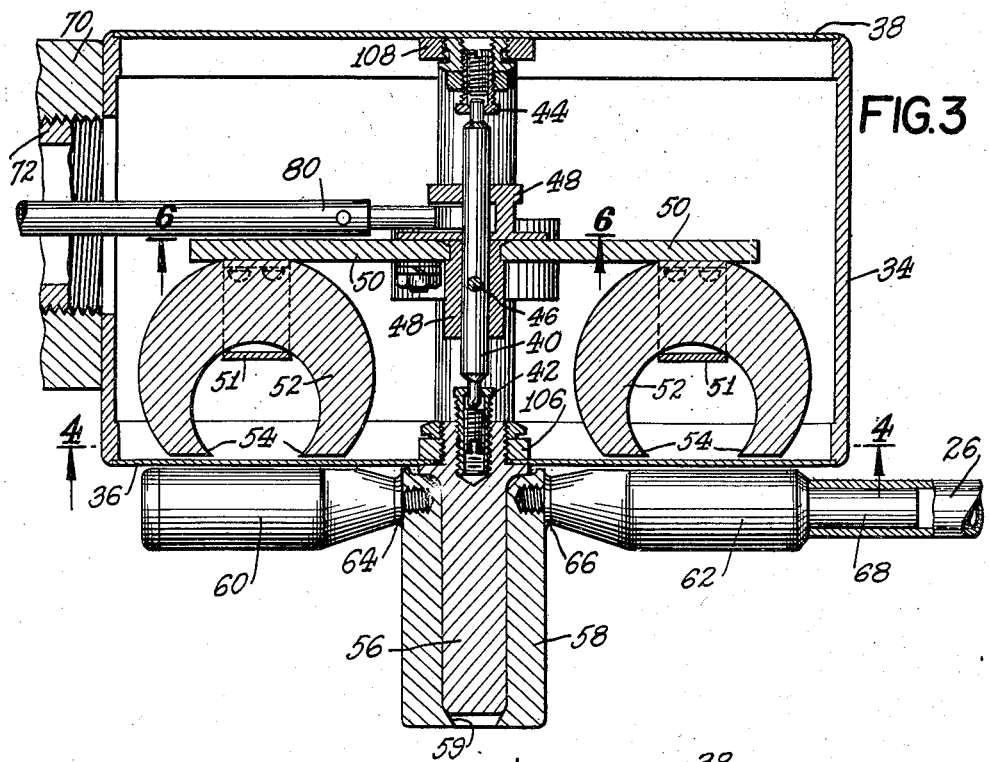
Fig. 3 is a sectional view on line 3—3 of Fig. 2.
Figure 4:
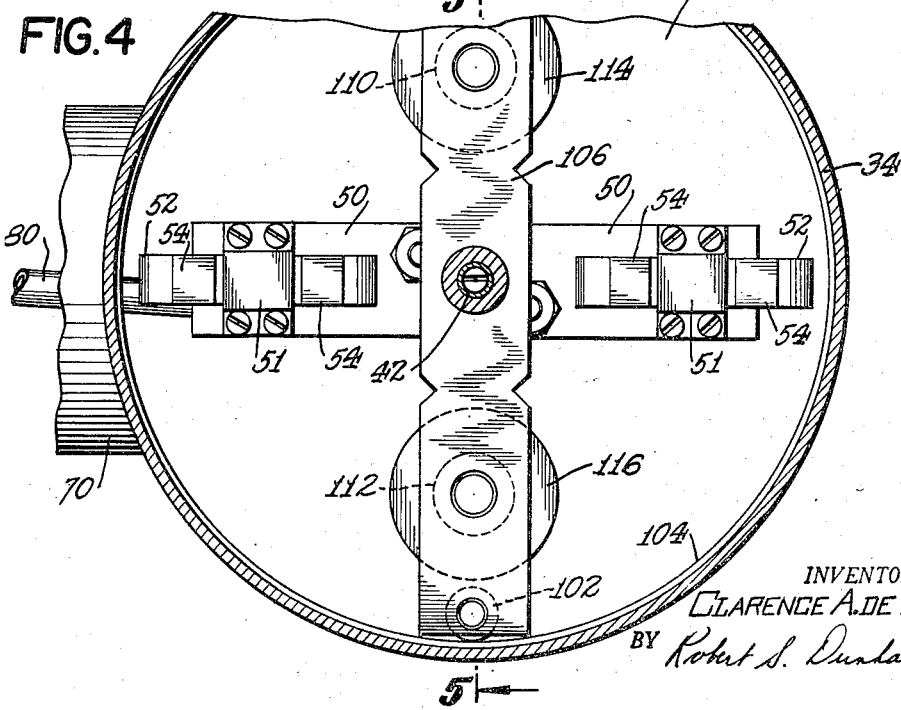
Fig. 4 is a view on line 4—4 of Fig. 3.

Fig. 6 is an enlarged detailed view on line 6—6 of Fig. 3.

Referring to Figs. 1 and 2, the tank 20 contains liquid 22 on which rests a float 24 on the free end of an arm 26, whereby as the level of the float changes, the volume of liquid will be indicated by the pointer 28 on an appropriately graduated chart 30 in indicator 32 (Figs. 1 and 2), as in the above mentioned patent.

The present invention relates to the means, which will now be described, for transmitting the movement of the float to the indicator.

The transmitter (Figs. 2 and 3), comprises a fluid-tight drum 34 having front and rear heads 36 and 38 respectively.

A rotatable shaft 40 is supported axially in drum 34 by bearings 42 and 44 (Figs. 3 and 5).

Keyed on shaft 40 by pin 46 (Fig. 3) is a hub 48 to which are bolted a pair of flat radial arms 50, and on each of those arms is mounted, by a clamp 51, a permanent horseshoe magnet 52 with its poles 54 close to front head 36 of drum 34.

On front head 36, in axial alignment with shaft 40, is a cylindrical boss 56 carrying a freely rotatable hub 58 on which is secured a pair of aligned, radially projecting arms 60 and 62 of magnetic material. Welds 64 and 66 attach the arms to hub 58. Arm 62 has an axial projection 68 to which float arm 26 is attached. The magnetic arms 60 and 62 are preferably flattened on the sides adjacent to the drum 34. The bore of the outer end of hub 58 may be decreased as indicated at 59 to prevent putting the hub onto boss 56 wrong end first.

With the above described structure in mind it will be appreciated that any vertical movement of float 24 will rotate arms 60 and 62 around hub 56; and since the arms serve as armatures for magnets 56, the magnets, being freely rotatable on shaft 40, will always preserve their positions opposite their armatures, even though head 36 is between the magnets and armatures.

Drum 34 has an internally threaded, laterally extending neck 70 (Figs. 2, 3) which serves to clamp the drum to the tank wall, in cooperation with an externally threaded sleeve 72 on which is a nut 74. A washer 76 forms a fluid-tight seal with the wall of tank 20.

Indicator 32 is mounted on the outer end of sleeve 72 by means of a threaded flange 78. An indicator-actuating rod 80 passes substantially axially through the sleeve 72 and serves to connect crank pin 82 (Fig. 6) which is rigid with the hub 48 (Figs. 3 and 6), through this rod 80 and a coupling 84 to arm 86. The arm 86 is rigidly connected to one end of a lever 88, which is pivoted at 90 and carries on its free end an arcuate rack 96 engaging a pinion 98 which rotates pointer 28 to indicate the tank contents on chart 30. A bellows 100 in well known manner seals the indicator proper from the other chambers of the unit.

The magnets and other parts rotatable on shaft 40 are supported, as illustrated, by stationary vertical bars 106, 108 which are at right angles to the mean position of the magnet-supporting bars 50, and are fixedly located by discs 102 in circumferential grooves 104 in drum 34. Bars 106, 108 are rigidly interconnected by cross-bars 110 and 112 which carry rubber bumpers 114 and 116 respectively to cushion the magnets should occasion require.

It is to be understood that the invention is not limited to the specific embodiment herein illustrated and described but may be used in other ways without departure from its spirit as defined by the following claims.

I claim:

1. Apparatus for indicating the level of liquid in a tank, comprising a housing totally closed to the interior of the tank and having at least one wall exposed to the tank interior, rotatable means located wholly within said housing and mounted for rotation about an axis substantially perpendicular to said wall, an indicator, means controlled by said rotatable means for operating said indicator, a stationary pintle stud rigid with said wall and outside said housing and projecting therefrom into the interior of said tank in a direction substantially in prolongation of said axis, a second rotatable means carrying a float and mounted for free rotation on said stud, and being freely slidable for removal from said stud, a magnet carried by at least one of said rotatable means and having its poles eccentric of said axis, magnetic means carried by the other of said rotatable means and cooperable with said magnet to transmit rotating force from said second rotatable means, which is actuated by said float, to control the position of said indicator, the magnetic attraction between said rotatable means constituting the sole means effective to prevent said second rotatable means moving axially off said stud.

2. Apparatus for indicating the level of liquid in accordance with claim 1, wherein said magnet is carried by the first named rotatable means within said housing and comprises at least one permanent magnet, and wherein said magnetic means is carried by the second named rotatable means and comprises at least one body of magnetic material adapted to be attracted by said permanent magnet.

3. Apparatus for indicating the level of liquid in accordance with claim 1, wherein said magnet is carried by the first named rotatable means within said housing and comprises a pair of horse-shoe magnets mounted on said first named rotatable means at points spaced from said axis, at about 180° around said axis from each other, and with their poles directed toward but spaced from said wall; wherein said magnetic means is carried by said second rotatable means which carries said float and comprises a pair of similar bodies of magnetic iron disposed about said axis in an arrangement similar to that of said horseshoe magnets and spaced from said wall; and wherein said second rotatable means includes a hub mounted for free sliding movement on said stud and having a portion at its outer end provided with an aperture smaller in diameter than the diameter of said stud and serving to prevent said hub moving more than a predetermined distance on said stud toward said wall.

CLARENCE A. DE GIERS.

REFERENCES CITED

The following references are of record in the file of this patent:

UNITED STATES PATENTS

| Number | Name | Date |
| --- | --- | --- |
| 27,498 | Hoyt | Mar. 13, 1860 |
| 593,571 | Fay | Nov. 16, 1897 |
| 903,212 | Martin | Nov. 10, 1908 |
| 1,945,736 | De Giers | Feb. 6, 1934 |
| 2,182,469 | Davis | Dec. 5, 1939 |
| 2,311,387 | Hastings | Feb. 16, 1943 |

FOREIGN PATENTS

| Number | Country | Date |
| --- | --- | --- |
| 315,989 | Great Britain | July 25, 1929 |
| 140,326 | Great Britain | Mar. 25, 1920 |

Certificate of Correction

Patent No. 2,562,529                                           July 31, 1951

CLARENCE A. DE GIERS

It is hereby certified that error appears in the printed specification of the above numbered patent requiring correction as follows:

Column 1, line 3, before the words "in the tank" insert *for the purpose of indicating the amount of liquid*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*